United States Patent
Yeow et al.

(10) Patent No.: US 7,908,185 B2
(45) Date of Patent: Mar. 15, 2011

(54) SYSTEM AND METHOD FOR INVENTORY REPLENISHMENT

(75) Inventors: SonSeng Yeow, Penang (MY); ChinLin Tan, Penang (MY)

(73) Assignee: Seagate Technology LLC, Scotts Valley, CA (US)

( * ) Notice: Subject to any disclaimer, the term of this patent is extended or adjusted under 35 U.S.C. 154(b) by 2205 days.

(21) Appl. No.: 10/692,516

(22) Filed: Oct. 24, 2003

(65) Prior Publication Data

US 2004/0143486 A1 Jul. 22, 2004

Related U.S. Application Data

(60) Provisional application No. 60/421,476, filed on Oct. 25, 2002.

(51) Int. Cl.
G06Q 10/00 (2006.01)
(52) U.S. Cl. .......................... 705/28; 705/10
(58) Field of Classification Search .............. 705/28, 705/10
See application file for complete search history.

(56) References Cited

U.S. PATENT DOCUMENTS

| | | | |
|---|---|---|---|
| 6,341,271 B1 * | 1/2002 | Salvo et al. | 705/28 |
| 7,574,383 B1 * | 8/2009 | Parasnis et al. | 705/28 |
| 2002/0099598 A1 * | 7/2002 | Eicher et al. | 705/11 |
| 2003/0004784 A1 * | 1/2003 | Li et al. | 705/10 |
| 2004/0034581 A1 * | 2/2004 | Hill et al. | 705/28 |

* cited by examiner

*Primary Examiner* — Vanel Frenel
(74) *Attorney, Agent, or Firm* — McCarthy Law Group (57) ABSTRACT

A system and method for replenishing low inventory. A first terminal is associated with a user's site for entering and displaying information. A second terminal associated with a supplier's site for entering and displaying information. A network is connected to said first terminal and said second terminal for exchanging information between said first terminal and said second terminal. A replenishment module executing computer readable instructions stored in memory continuously displays a signal having a first visual characteristic simultaneously to both terminals in response to the user requesting a replenishment of inventory, and subsequently modifies the signal simultaneously to both terminals to continuously display a second visual characteristic different than the first visual characteristic responsive to the supplier sending the requested replenishment of inventory and during the time that the requested replenishment of inventory is in transit to the user.

16 Claims, 8 Drawing Sheets

FIG. 5 cont. (EXPLODED VIEW OF FIG. 5 SECTION A )

FIG. 5 cont. (EXPLODED VIEW OF FIG. 5 SECTION B)

FIG. 5 cont. (EXPLODED VIEW OF FIG. 5 SECTION C)

SYSTEM AND METHOD FOR INVENTORY REPLENISHMENT

CROSS REFERENCE TO RELATED APPLICATIONS

This application claims the benefit of U.S. Provisional Application No. 60/421,476, filed Oct. 25, 2002.

BACKGROUND OF THE INVENTION

1. Field of the Invention

The present invention relates generally to the field of logistics and product flow management and more particularly to visual control systems that permit routine material transactions.

2. Description of the Related Art

The modern economy depends on the transfer of products and information between various sites that can be next to each other or on the other side of the globe. For example, modern manufacturing processes may require building one component of a complex device in one country and shipping that finished component to another country where it is integrated into a more complex device. One example is the hard drive industry where a hard drive consists of various components such as a motor, a read/write head and a magnetic recording disk. For economic reasons a company building a hard drive may think it is advantageous to build a read/write head in one country and ship that finished head to another country where it is integrated into a hard drive. In order to make this process efficient, the read/write head manufacturing facility must have a fast reliable flow of product through it as well as the hard drive manufacturing facility that relies on receiving the finished read/write heads on schedule without having to store excess inventory. Reliable and quick communication within a site and between these sites is important to making the global economy function.

Similarly, the distribution of finished goods has become much more dependent on reliable and quick communication. Many companies are insisting on distribution networks that require manufacturers to warehouse goods and have the goods available on demand. These types of distribution networks are called just-in-time (JIT) Hubs. Management of these distribution centers can be problematic because of the conflicting requirements that each JIT Hub has enough supply available to meet customer demands but not have too much stock on hand that it takes away inventory from other JIT HUBs also needing the inventory.

Inventory replenishment becomes even a bigger problem when the warehouse and the point of use are not in the line of sight of each other. One reason why the problem is compounded when the warehouse and point of use site are not in each other's line of sight is because of inadequate communications. When two sites cannot communicate efficiently the process slows down and this leads to problems. Another problem is that limited space at point of use site can lead to problems because the point of use site may take too long to reorder parts and the warehouse may not react quickly enough when they are not in each other's line of sight.

Conventional methods of routing materials and transacting the routing have many problems. These problems have created many needs including the need to 1) balance the production rate to the customer demand, 2) use the correct number of people for the required production rate, 3) insure that equipment runs only at the rate of demand, 4) keep only a small stock to maintain a smooth flow, 5) build quality control into the production process, 6) restructure the whole system to improve performance, 7) provide features such as email alert, report generation, undo function, etc. required by users.

Therefore a system and method providing for replenishing low inventory quickly and reliably so that the smooth process flow can occur throughout the entire distribution network is needed. Additionally, a real time demand pull system from the point of use to the point of replenishment to improve the speed and flow of information across the factory to achieve rhythm, flow and balanced of the factory operation is needed.

SUMMARY OF THE INVENTION

The following system and method provides a solution to the above-mentioned problems by providing a structured system in both functionality and programming which provides better performance, quicker response and a single source code which can be deployed by multiple sites.

A system tool that enables all parties within a supply chain to break away from the paradigm of individual organization silo to engage in the paradigm of a virtual organization to create a distinctive advantage.

Additionally, a method for material handling and routing materials is disclosed. The method for replenishing low inventory begins by first collecting inventory data that represents the supply level or quantity of a part. Next, the inventory data, including the supply level, is uploaded to a database where the inventory data is compared to a trigger so that a decision can be made as to whether the supply is too low and requires replenishment. If the supply is low and needs to be replenished then a first person is alerted that the supply of the part is low and needs to be replenished. The first person continues to be alerted until the low supply part is sent and the sender has verified that the part has been sent. This alert can take the form of a RED color showing up on a computer terminal that remains RED until the sender verifies that the part has been sent. Once it is acknowledged that the part has been sent then the database is updated with this information and the alert of low inventory is changed to a second alert signifying that the part is in transit. This second alert can take the form of a YELLOW color showing up on a computer screen. This second YELLOW alert, alerts the receiver as well as others that the parts are in transit. Once the part arrives and an acknowledgement is made indicating that the part has arrived, an acknowledgement signal is sent. The acknowledgement can be a GREEN color showing up on the computer screen.

In another embodiment having an environment where the parts are batched and replenished at a predetermined schedule, such as an airplane or truck departure schedule, an acknowledgement that the airplane or truck has been loaded is done by clicking on the screen, changing the color of a portion of the screen to blue, indicating that the parts are prepared on the airplane or truck. When the airplane or truck departs a further acknowledgement is made, typically by clicking on the screen, to indicate that the parts are in transit. The solution maintains the communication link between requestor and sender even in an environment that requires only movement of parts in batches other than continuous.

In another embodiment a method of replenishing parts to a site according to an actual demand of the site, from a warehouse where the warehouse and the site are physically separated is disclosed. The method includes first collecting inventory data that represents the supply of a part at the site and then uploading the inventory data to a database. Next, the inventory data is compared to a trigger and a decision is made as to whether the supply of the part at the site requires replenishment. Next the method provides a line of sight communication between the site and the warehouse to synchronize the flow of the part at the demand rate resulting in the site and the warehouse operating as though they are next to one another.

BRIEF DESCRIPTION OF THE INVENTION

DETAILED DESCRIPTION OF THE PREFERRED EMBODIMENTS

The invention provides a system and method to synchronize the flow of materials based on real demand from critical points of the supply chain to the point of use. This invention has applications in many areas that require a steady supply of materials that must be replenished such as a manufacturing assembly line that requires parts at many operations or a distribution hub that supplies finished goods to customers according to customer demand. For example, one area where this invention is applicable is the hard drive industry where components are manufactured using assembly line processes and are eventually distributed to customers on a customer demand or customer pull basis.

Figure 1:
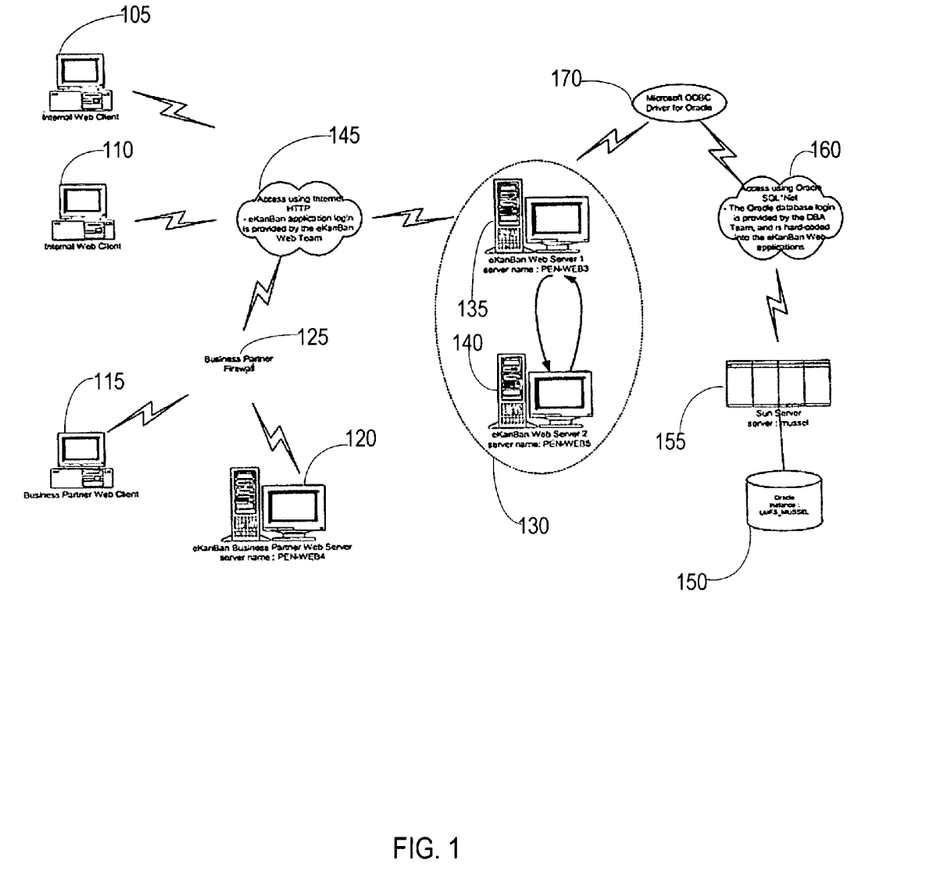
FIG. 1 is a diagram illustrating the web architecture used to replenish low inventory parts in accordance with one embodiment of the invention.

FIG. 1 is a diagram illustrating the web architecture used to replenish low inventory parts in accordance with one embodiment of the invention. FIG. 1 includes a first internal web client 105, a second internal web client 110, a business partner web client 115, a business partner web server 120, a web server network 130 comprising a first web server 135 and a second web server 140, an external server 155 and database 150. The first internal web client 105 and the second internal web client 110 access the web server network 130 with a software application 145 for Internet web access whereas the business partner web client 115 and the business partner web server 120 access the web server network 130 through a business partner firewall 125 with the software application 145. The external server 155 and database 150 communicate with the server network 130 with a second software application 160 and a driver 170.

First internal web client 105 and second internal web client 110 are located inside a company and can represent workstations located at particular sites of a manufacturing facility. For example in a magnetic disk manufacturing facility, first internal web client 105 can be the texturing site which requires a steady stream of incoming substrates and cassettes to hold the substrates as well as other consumables such as slurry used for texturing. Similarly second internal web client 110 can represent workstations located at another particular site such as the disk-cleaning site. Manufacturing personnel can use first internal web client 105 and second internal web client 110 to enter inventory data that will be used to determine when it is time to replenish parts. First internal web client 105 and second internal web client 110 use first software application 145 to login and connect to the internal web server 130. First software application 145 can use the hyper-text-transfer-protocol (HTTP) to enable the connection and communication between the web clients and the internal web server 130. Similarly, the internal web server 130 uses second software application 160 to communicate with the external server 155 and database 150. Second software application 160 can use, for example, communication using an Oracle SQL*Net.

Server Network 130 is responsible for routing requests between the different sites and the external server as is further discussed with reference to FIG. 2 below. External business partner web client 115 and the business partner web server 120 can access the web server network 130 through a business partner firewall 125 using similar software as first software application 145. One major difference is that external users must go through the business partner firewall 125.

Figure 2:
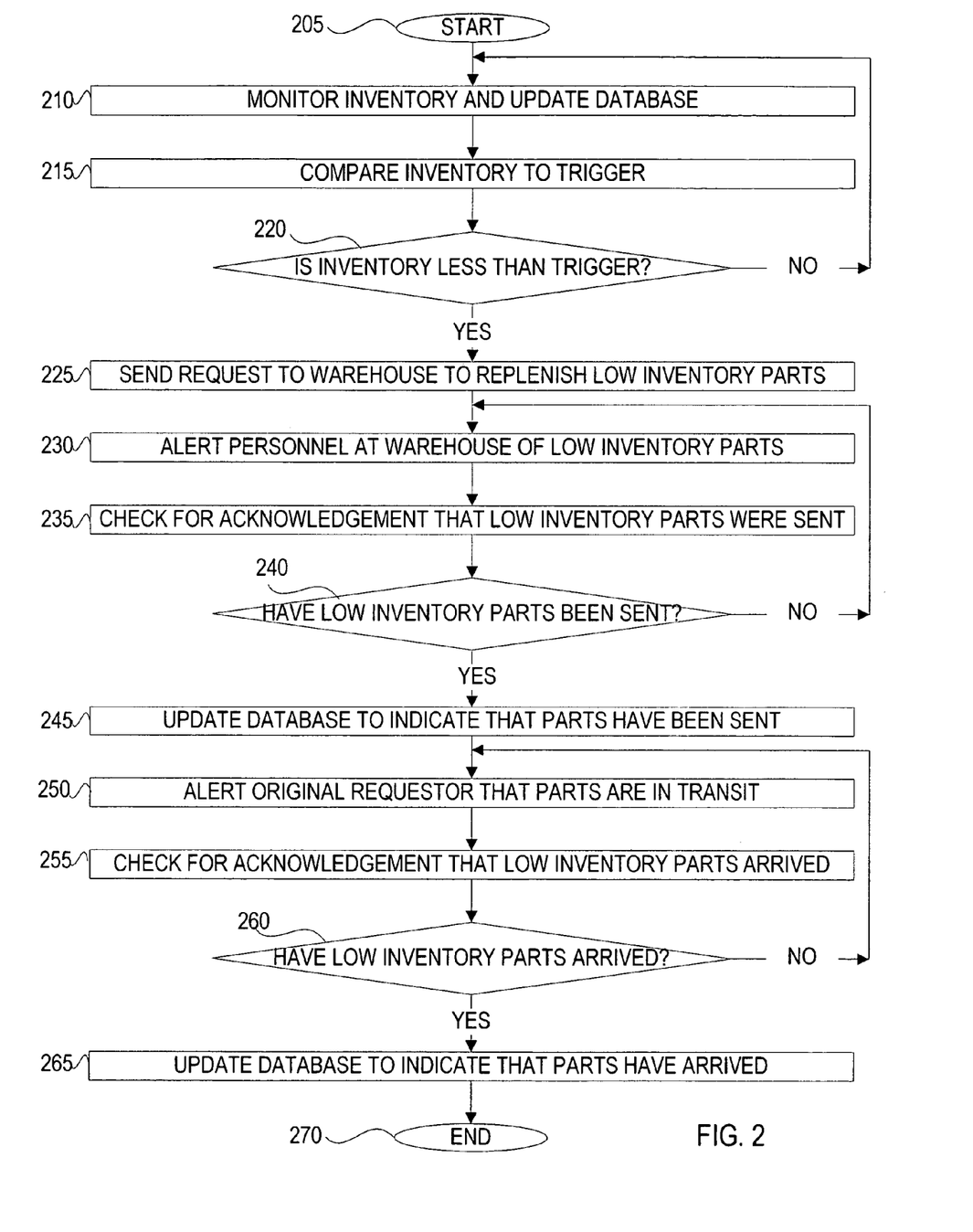
FIG. 2 is a flow chart showing the method for replenishing low inventory parts.

FIG. 2 is a flow chart showing an overview of the steps needed to synchronize the flow of materials based on real demand in accordance with one embodiment of the invention. First in step 205, the process begins by logging onto the system. The logging on process consists of asking for a user name and password. Once the user name and password have been entered, the system verifies that the information is correct and logs the user on if the information is correct.

Next in step 210, the inventory is monitored and the data is uploaded to the database. The inventory can be monitored according to some sampling rate such as counting the amount of parts being used, counting the remaining inventory every hour or keeping track of usage according to some well defined model. As the inventory is monitored it is uploaded into a database. The data is uploaded into a database as quickly as possible to ensure accurate and current data at all times. Although it is preferable to upload data in real time or as soon as possible it may not always be necessary. If the process being supported is slow enough such that the replenishing rates are slow then inventory data can be stored for minutes, hours or days before it is uploaded into the database. Nevertheless, the preferable method of uploading data to the database is real time, which means that the data is uploaded to the database as soon as it is acquired, usually within seconds or minutes.

Next in step 215, the inventory data that has been uploaded to the database is compared with triggers that have been predetermined. The triggers are set so that when the inventory of a particular item drops below the trigger value it is time to replenish the inventory at the specific site. Some factors used to determine the trigger value include the consumption rate, amount of time it takes to order parts and deliver them to the site consuming the parts, and capacity to store parts at the site. One example of data that could be used in a model for determining the trigger value is for parts that are delivered in two hours, the consumption rate is 10 parts per hour, the site can hold 1000 parts, and the minimum number of parts that must be stored is 100. With such data, parts would be sent from the warehouse to the site when the warehouse detects an inventory of parts at the site equal to 120 parts. The amount of parts that would be sent could be as much as 900 parts because when the parts arrive there should be 100 parts left and room to house 900 more parts. Other models using similar criteria can be used.

Next in step 220, a decision is made as to whether the inventory of parts is less than the trigger value. Comparing the inventory value with the trigger value can do this. If the decision reached is that the inventory of the parts has not dropped below the trigger value then the process goes back to step 210 where the inventory is monitored. Since this is an ongoing loop this check can occur very quickly only limited by the processor speed of the computer running the steps. If the decision reached is that the inventory of parts has dropped below the trigger value then a replenishment request is sent in step 225.

In step 225, an electronic request is sent to the warehouse to replenish the low inventory parts. The electronic request is typically sent from the processor that is comparing the uploaded inventory data with the trigger value and can reside on the same computer or server storing the uploaded inventory data. The electronic request can be sent to the warehouse that houses the parts as well as other sites such as the site that is consuming the parts or other sites. The electronic request can also be sent to a centralized server, which is in turn connected to users that are logged on through an intranet or Internet.

In step 230, the warehouse receives a signal notifying and alerting it that a specific site has low inventory of certain parts and that those parts need to be replenished. The warehouse is alerted in such a way that the personnel responsible for identifying and shipping the low inventory parts are immediately aware of the low inventory so that a responsible person can quickly respond. In one embodiment the personnel are alerted through a computer screen having a color-coded system. When inventory of a particular part is low and replenishment of that part is required, a portion of the screen that is associated with the site and part having low inventory turns red color. The warehouse personnel then see the red color and quickly take action. In other embodiments, the warehouse personnel are alerted through pagers, cell phones or other electronic means. The means chosen to alert the warehouse should be one wherein the warehouse personnel are notified of the replenishment request immediately so that action can be taken immediately. This can be accomplished by various visual or audio techniques.

In step 235 a check is made to determine if an acknowledgment has been made that the low inventory parts have been sent to the requester. The alerted warehouse personnel can make the acknowledgement after sending the low inventory parts to the requestor. Next in step 240, a decision is made as to whether the requested low inventory parts have been sent from the warehouse to the requestor site. Analyzing the check made in step 235 to see if the warehouse personnel have made an acknowledgement assists in making this decision. If the decision reached in step 240 is that the low inventory parts have not been sent to the requestor then personal at the warehouse continue to be alerted that inventory is low. If the decision reached in step 240 is that the low inventory parts have been sent to the requestor then the database is updated, in step 245, to indicate that the low inventory parts have been sent.

In step 245, the database is updated to indicate that the warehouse has sent the low inventory parts. Once the database has been updated to indicate that the low inventory parts have been sent the status of the low inventory parts changes to in transit. Next in step 250 the original requestor is alerted that the low inventory parts are in transit. The original requestor is alerted that the parts are in transit in such a way that the original requestor is immediately notified so that the original requestor can quickly respond when the low inventory parts arrive. In one embodiment the original requestor is alerted through a computer screen having a color-coded system, which is like the system described with reference to step 230. When the low inventory parts are in transit, a portion of the screen that is associated with the site and part having low inventory turns yellow color. The original requestor can then see the yellow color and quickly take action in anticipation of the arriving parts. In other embodiments, the original requestors are alerted through pagers, cell phones or other electronic means. The means chosen to alert the original requester should be one wherein the original requestor is notified that the low inventory parts are in transit immediately so that action can be taken immediately. This can be accomplished by various visual or audio techniques.

In step 255 a check is made to determine if an acknowledgment has been made that the low inventory parts have arrived at the site requesting the low inventory parts. The original requestor can make the acknowledgement after receiving the low inventory parts that he requested. Next in step 260, a decision is made as to whether the requested low inventory parts arrived at the requestor site. Analyzing the check made in step 255 to see if an acknowledgement was made assists in making this decision. If the decision reached in step 260 is that the low inventory parts are not at the requestor site then the original requester at the requesting site continues to be alerted that that inventory is in transit. If the decision reached in step 260 is that the low inventory parts have arrived at the requestor site then the database is updated, in step 265, to indicate that the low inventory parts arrived.

In step 265, the database is updated to indicate that the low inventory parts arrived at the requesting site. Once the database has been updated to indicate the arrival of the low inventory parts, the status of the low inventory parts changes to arrived. In this step, all sites are alerted that the request has been completed. In one embodiment, all sites are alerted through a computer screen having a color-coded system, which is like the system described with reference to step 230. When the low inventory parts arrive at the requesting site and the arrival has been acknowledged, a portion of the screen that is associated with the site and part having low inventory turns green color. All sites can then see the green color and realize that the order for low inventory parts is complete. In other embodiments, the sites can be alerted through various other means including pagers, cell phones or other electronic means that are visual or audio.

Figure 3:
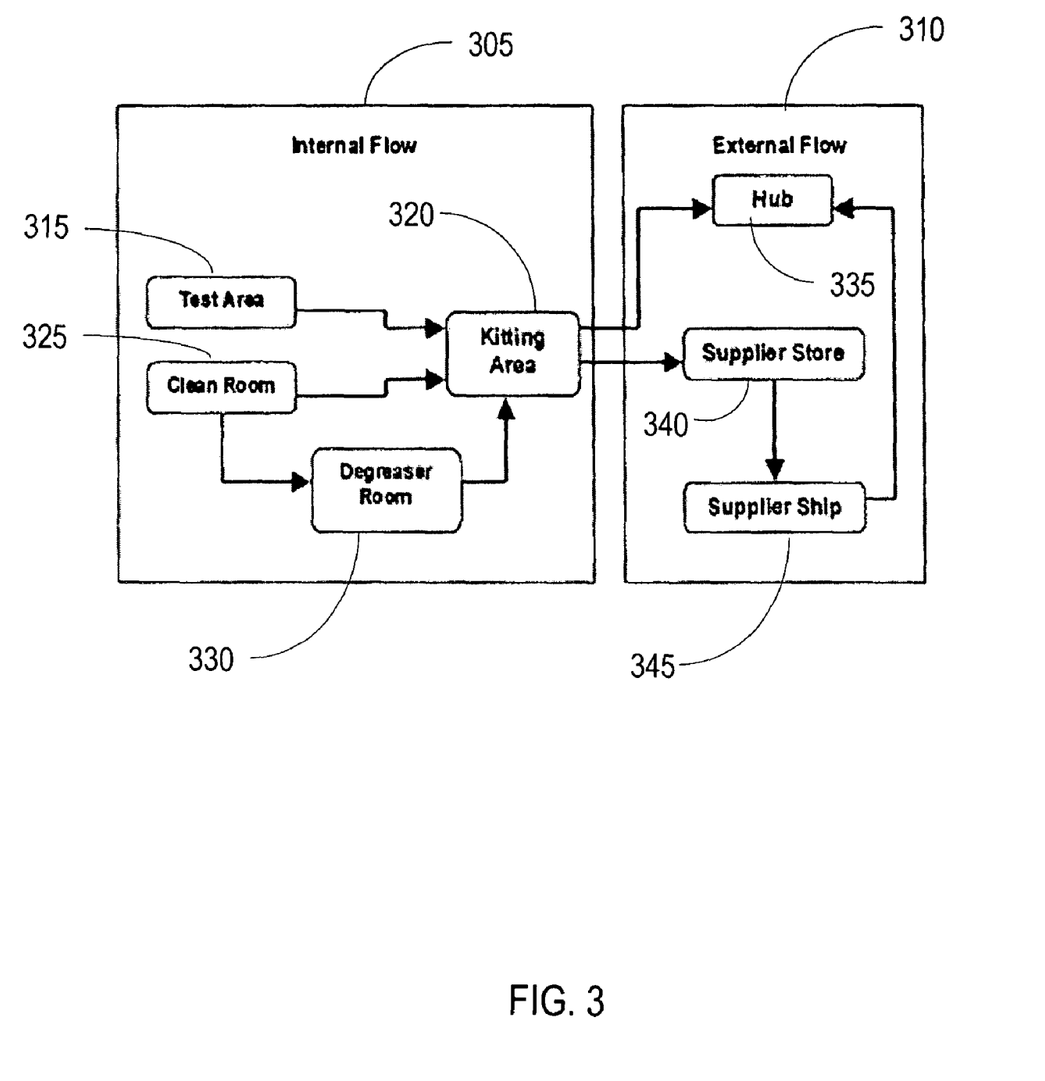
FIG. 3 is a high level process flow diagram of one application using the method of replenishing low inventory parts described in the flow chart of FIG. 2.

FIG. 3 is a high-level process flow diagram of one application that uses the method of replenishing low inventory parts described in the flow chart of FIG. 2. The application illustrated in FIG. 3 is specific to a front end media manufacturing process used to make magnetic media discs used in hard drives and shows information flowing through an internal process 305, then to an external process 310 and finally through the external process 310. The internal process consists of magnetic media disks being tested in the Test Area 315 and then being transferred to the Kitting Area 320. The process starts in the Test Area 315 where the magnetic media disks are tested for performance and reliability. Some of the tests performed can include certification testing and glide testing. Certification testing includes writing a signal to the magnetic media and reading it back to test how signals will be recorded on the magnetic media once it is installed in a finished hard drive. Glide testing includes testing for physical defects that could cause a head crash by gliding a head over the magnetic media disk and looking for defect signals such as thermal asperities. This testing can be 100% testing of all incoming magnetic media disks or it can be sample testing where only a statistical portion of the incoming magnetic media disks are tested. The data for this testing is uploaded to a database that stores the quantity of good magnetic media disks that is available for shipping to the kitting area 320. When the kitting area 320 is low on magnetic media disks it puts a request in for replenishing its low inventory. The testing area receives this request and ships magnetic media disks that pass the testing criteria to the kitting area 320 in accordance with the process flow of FIG. 2. Although not shown in this diagram, the test area 315 also requests incoming parts from its supplier when its inventory of tested magnetic media disks drops below a predetermined value. This request is also done in accordance with the flow chart of FIG. 2.

The kitting area 320 is where the magnetic media disks are segregated into different cassettes and packaged for shipping. This process involves separating the magnetic media disks into different cassettes and vacuum sealing the loaded cassettes in an antistatic package wrap. Once the magnetic media disks have been loaded into cassettes and vacuum-sealed, the information is uploaded into a database that stores the amount of magnetic media disks ready for shipping to the next process.

Similarly, parts can flow directly from the clean room 325 to the kitting area 320 or to a degreaser room 330 and then the kitting area 320. In this process the magnetic media disks go directly from the clean room, where they are sputtered and lubed, directly to the kitting area 320 or to a degreaser, where extra lubricant is removed, and then to the kitting area 320. Either way the data obtained in each process is uploaded to a database as previously described and each area requests replenishment of low inventory parts as previously described and in accordance with the process described with reference to FIG. 2.

From the kitting area 320, magnetic media disks leave the internal process flow 305 and go to the external process flow 310. When Hub 335 or supplier store 340 is low on inventory they request replenishment and the magnetic media disks are replenished in accordance with the process described with reference to FIG. 2. Similarly, supplier ship 345 receives replenished inventory from supplier store 340 and can replenish the Hub 335 in accordance with the process described with reference to FIG. 2.

Figure 4:
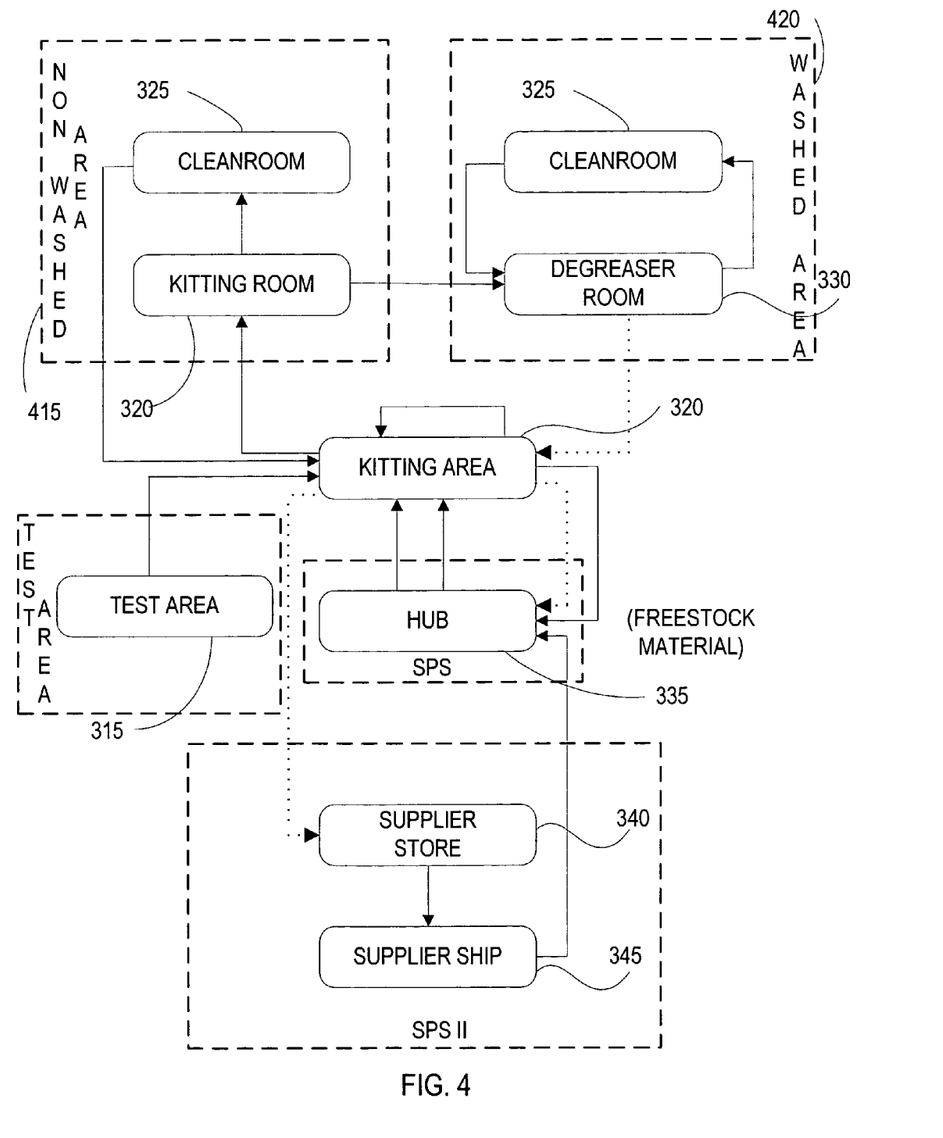
FIG. 4 is a flow chart showing the flow of signals between different sites.

FIG. 4 is a flow chart showing details of the flow of signals between different sites for the process described with reference to FIG. 3 above. FIG. 4 illustrates the transfer of signals between the Test area 315, kitting area 320, the non-washed area 415, the washed area 420, the hub 335, the supplier store 340, and the supplier ship 345. The non-washed area 415 further includes the clean room 325 and the kitting area 320. Similarly, the washed area 420 further includes clean room 325 and degreaser room 330.

Figure 5:
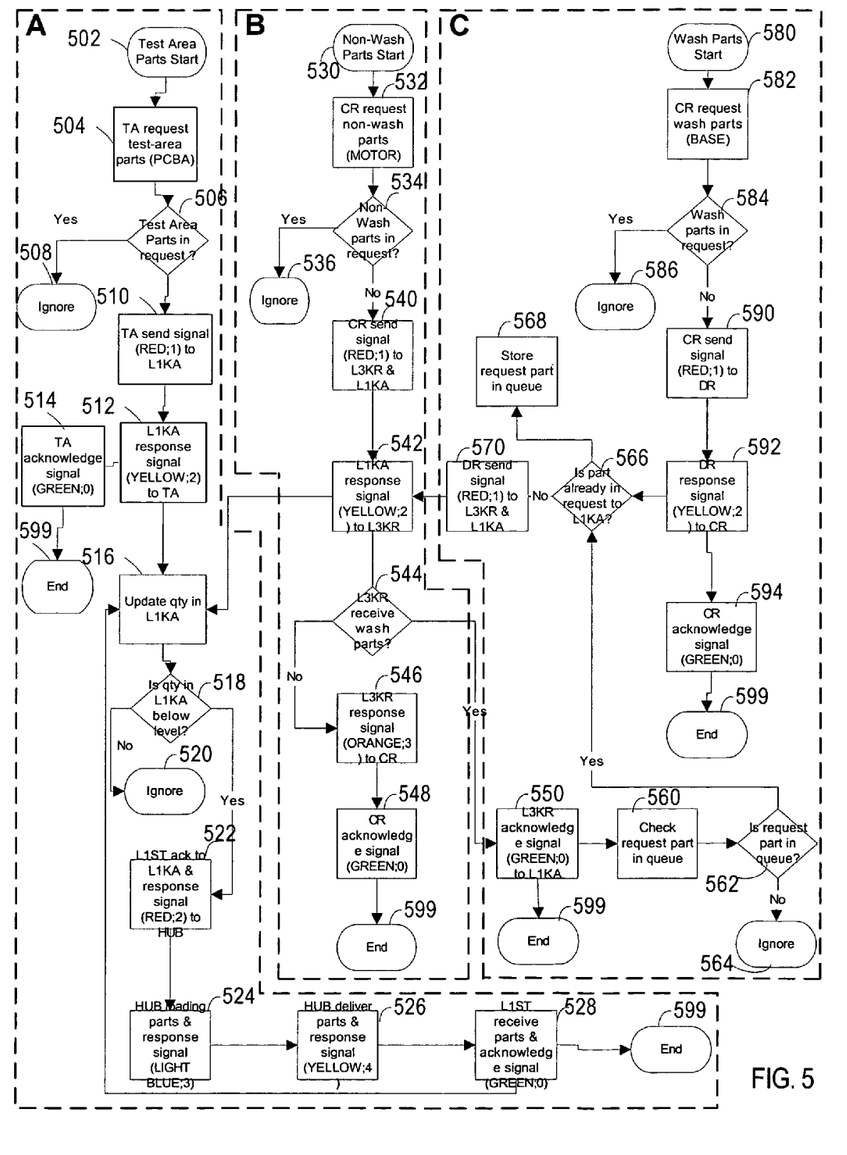
FIG. 5 is a flow chart illustrating further details of the FIG. 2 flow chart for one application that uses the low inventory replenishment method.

FIG. 5 shows further details of the low inventory replenishment process within the Test area 315, the non-washed area 415 and the washed area 420 of FIG. 4. The detailed flow charts of FIG. 5 illustrate further details of the FIG. 2 flow chart for one application that uses the low inventory replenishment method.

The process of handling test parts begins by conducting an inventory of the test area parts in step 502. These test area parts can include printed circuit board assemblies (PCBAs) as well as other parts. Next in step 504 the test area requests test area parts (PCBA). Next in step 506 a decision is made as to whether the test area parts have already been requested. If the decision reached is that the test area parts have been requested then the request from step 504 is ignored in step 508. However, if the decision reached in step 506 is that the test area parts have not been requested then the test area sends a signal in step 510 to the Level One Kitting Area (L1KA) requesting parts and L1KA is alerted with a RED signal. Once L1KA responds by shipping the parts it signals to the testing area with a YELLOW signal. The testing area acknowledges receipt of the parts in step 514 by sending a GREEN signal to the L1KA area and the process ends in step 599. In addition to sending the requested parts, the L1KA area updates the quantity in L1KA inventory in step 516. Next, a decision is made in step 518 as to whether the L1KA inventory level is below a predetermined critical level. If the inventory in L1KA is not below the critical level the check is ignored in step 518. However, if the decision reached in step 518 is that the inventory level is below the critical level then a request is sent to Level One Store Area (L1ST) in step 522 requesting parts and L1ST and the Hub which will send the parts is alerted with a RED signal. Once the Hub responds by shipping the parts it signals to L1ST with a BLUE signal in step 524. Once the Hub delivers the parts to L1ST, the HUB signals with a YELLOW color, in step 526, to indicate that L1ST has the parts and can forward the parts to L1KA. The parts are then sent to L1KA who acknowledges receipt of the parts, in step 528, by sending a GREEN signal to L1ST. Finally the process ends in step 599.

In step 530 the process handling non-wash parts begins by conducting an inventory of its parts. These non-wash parts can include motors. Next in step 532 a request is made to supply non-wash parts (motors). Next in step 534 a decision is made as to whether the non-wash parts have already been requested. If the decision reached is that the non-wash parts have been requested then the request from step 532 is ignored in step 536. However, if the decision reached in step 534 is that the non-wash parts have not been requested then the requestor sends a signal in step 540 to the Level Three Kitting Area (L3KA), L3KA and L1KA are alerted with a RED signal. Once L1KA responds by shipping the parts it signals to the requestor and Level Three Kitting Room (L3KR) with a YELLOW signal in step 542. In step 544 a decision is made as to whether L3KR has received the shipped non-wash parts. If the decision reached is that the parts have been received then L3KR acknowledges receipt of the parts by sending a GREEN signal is step 550. If the decision reached in step 544 is that the L3KR has not received the non-wash parts, the L3KR responds by sending an ORANGE signal to the requestor in step 548. Subsequently, the requestor acknowledges the ORANGE signal in step 548 and the process ends in step 599.

After L3KR acknowledges receiving the non-wash parts in step 550 the process can either end in step 599 or go to step 560 where a check is done to determine if the requested non-wash parts are in queue. Next in step 562 a decision is made as to whether the requested parts are in queue. If the decision reached is that requested parts are not in queue, then the check from step 560 is ignored in step 564. However, if the decision reached in step 562 is that requested parts are in queue, then another decision is made to determine whether the requested part is already at L1KA. If the decision reached in step 566 is that the requested parts are at L1KA, then in step 568 the requested part is stored in queue. However, if the decision reached in step 566 is that the requested parts are not are at L1KA, then in step 570 a RED signal is sent to L3KR and L1KA indicating that the requested parts are not in request to L1KA. The process then continues back to step 542 and goes through the loop again.

In step 580 the process handling wash parts begins by conducting an inventory of its parts. These wash parts can include base parts such as media, heads etc. Next, in step 582 a request is made to supply wash parts (base). Next, in step 584 a decision is made as to whether the wash parts have already been requested. If the decision reached is that the wash parts have been requested, then the request from step 584 is ignored in step 586. However, if the decision reached in step 584 is that the wash parts have not been requested, then the requestor sends a signal in step 590 to the DR requesting parts and the DR is alerted with a RED signal. Once DR responds by shipping the parts it signals to the requestor with a YELLOW signal in step 592. The process then shifts to step 566 where another decision is made to determine whether the requested part is already at L1KA. This leg of the process then continues to either step 568 or step 570 and subsequent steps. When the requestor receives the ordered parts, an acknowledgement which is color-coded GREEN, is sent in step 594. Finally the process ends in step 599.

In FIG. 5 the different levels represent the floors of a building. For example, L1ST represents level 1 store area. L1KA represents level 1 kitting area, which is an area that parts that need to be washed are sent to. L1KR represents level 1 kitting room, which is an area that parts that do not need to be washed are sent. Hub 524 is an external location that could be a supplier of parts.

Another advantage of this application is that a virtual factory can be set up which has the effect of line of sight communication between sites that are not actually in each other's line of sight. For example, luggage being transported in an airport can follow this method or an automobile processing plant where different components are made in different parts of the world and all assembled in one location can use this method.

In another embodiment having an environment where the parts are batched and replenished at a predetermined schedule, such as an airplane or truck departure schedule, an acknowledgement that the airplane or truck has been loaded is done by clicking on the screen, and changing the color of a portion of the screen to blue, indicating that the parts are prepared on the airplane or truck. When the airplane or truck departs a further acknowledgement is made, typically by clicking on the screen, to indicate that the parts are in transit. The solution maintains the communication link between requestor and sender even in an environment that requires only movement of parts in batches other than continuous.

In another embodiment a method of replenishing parts to a site according to an actual demand of the site, from a warehouse where the warehouse and the site are physically separated is disclosed. The method includes first collecting inventory data that represents the supply of a part at the site and then uploading the inventory data to a database. Next, the inventory data is compared to a trigger and a decision is made as to whether the supply of the part at the site requires replenishment. Next the method provides a line of sight communication between the site and the warehouse to synchronize the flow of the part at the demand rate resulting in the site and the warehouse operating as though they are next to one another.

It will also be recognized by those skilled in the art that, while the invention has been described above in terms of preferred embodiments, it is not limited thereto. Various features and aspects of the above-described invention may be used individually or jointly. Further, although the invention has been described in the context of its implementation in a particular environment and for particular applications, those skilled in the art will recognize that its usefulness is not limited thereto and that the present invention can be utilized in any number of environments and implementations.

We claim:

1. A system for replenishing low inventory, comprising:
    a first terminal associated with a user's site for entering and displaying information;
    a second terminal associated with a supplier's site for entering and displaying information;
    a network connected to said first terminal and said second terminal for exchanging information between said first terminal and said second terminal; and
    a replenishment module executing computer readable instructions stored in memory to continuously display a signal having a first visual characteristic simultaneously to both terminals in response to the user requesting a replenishment of inventory, and to subsequently modify the signal simultaneously to both terminals to continuously display a second visual characteristic different than the first visual characteristic responsive to the supplier sending the requested replenishment of inventory and during the time that the requested replenishment of inventory is in transit to the user.

2. The system of claim 1 wherein said first and second visual characteristics are graphical representations of data.

3. The system of claim 1 wherein said first visual characteristic is a first color and said second visual characteristic is a second color different than the first color.

4. The system of claim 1 wherein said first visual characteristic includes highlighting a portion of both terminals red.

5. The system of claim 1 wherein said second visual characteristic includes highlighting the portion of both terminals yellow.

6. The system of claim 1 wherein the replenishment module further subsequently modifies the signal simultaneously to both terminals to continuously display a third visual characteristic different than the first and second visual characteristics and responsive to the user acknowledging a receipt of the requested replenishment of inventory that was previously in transit.

7. The system of claim 6 wherein the third visual characteristic is a third color different than the first and second colors.

8. The system of claim 7 wherein said third visual characteristic includes highlighting the portion of both terminals green.

9. A method for replenishing inventory, comprising:
    establishing a supply chain communication link between a user's terminal and a supplier's terminal;
    continuously displaying a signal having a first visual characteristic simultaneously to both terminals in response to the user requesting a replenishment of inventory; and
    subsequently modifying the signal simultaneously to both terminals to continuously display a second visual characteristic different than the first visual characteristic responsive to the supplier sending the requested replenishment of inventory and during the time that the requested replenishment of inventory is in transit to the user.

10. The method of claim 9 wherein the continuously displaying step and the subsequently modifying step are characterized by said first and second visual characteristics being graphical representations of data.

11. The method of claim 9 wherein the continuously displaying step and the subsequently modifying step are characterized by said first visual characteristic being a first color and said second visual characteristic being a second color different than the first color.

12. The method of claim 9 wherein the continuously displaying step is characterized by said first visual characteristic including highlighting a portion of both terminals red.

13. The method of claim 9 wherein the subsequently modifying step is characterized by said second visual characteristic including highlighting the portion of both terminals yellow.

14. The method of claim 9 further comprising subsequently twice modifying the signal simultaneously to both terminals to continuously display a third visual characteristic different than the first and second visual characteristics and responsive to the user acknowledging a receipt of the requested replenishment of inventory that was previously in transit.

15. The system of claim 14 wherein the subsequently twice modifying the signal step is characterized by said third visual characteristic being a third color different than the first and second colors.

16. The system of claim 15 wherein the subsequently twice modifying the signal step is characterized by said third visual characteristic including highlighting the portion of both terminals green.

* * * * *